United States Patent

Worbois

[15] 3,653,723
[45] Apr. 4, 1972

[54] BRAKE APPARATUS
[72] Inventor: Robert J. Worbois, Irwin, Pa.
[73] Assignee: Westinghouse Air Brake Company, Wilmerding, Pa.
[22] Filed: May 21, 1970
[21] Appl. No.: 39,288

[52] U.S. Cl. ............................................. 303/20, 303/67
[51] Int. Cl. ............................................................ B60t 15/18
[58] Field of Search ........................... 105/61; 303/20, 25, 67

[56] References Cited

UNITED STATES PATENTS

| 3,539,226 | 11/1970 | Barber | 303/20 |
| 3,374,035 | 3/1968 | Howard | 303/20 |
| 3,525,556 | 8/1970 | Ferguson | 303/20 X |
| 3,560,057 | 2/1971 | Worbois | 303/20 X |

Primary Examiner—Milton Buchler
Assistant Examiner—Stephen G. Kunin
Attorney—Ralph W. McIntire, Jr.

[57] ABSTRACT

This invention relates to brake control apparatus for a slave locomotive of a remote multiple unit locomotive control system wherein a brake control console on the lead locomotive is manually operable to control the brakes on the forward portion of the train, and also to effect corresponding control (via radio-transmitted signals initiated by manual operation of this brake control console) of the brakes on the remaining portion of the train by the brake apparatus on a slave locomotive remotely located in the train. This control apparatus on the slave locomotive is operable, upon loss of radio control thereof from the lead locomotive, in response to a reduction of pressure in the train brake pipe effected by manual operation of the brake control console on the lead locomotive, to cause the brake pipe cut-off valve of the brake valve on the slave locomotive to operate to cut-off or terminate charging of the train pipe by the brake valve on the slave locomotive irrespective of the degree of train brake pipe leakage.

7 Claims, 2 Drawing Figures

BRAKE APPARATUS

BACKGROUND OF THE INVENTION

One so-called RMU (remote multiple unit) locomotive control system presently in use on American Railroads for controlling operation of freight trains in excess of 50 cars in length embodies a brake control console on the lead locomotive that is manually operative to effect electro-pneumatically variations of pressure in the front portion of the train brake pipe and also to effect, via radio-transmitted signals, corresponding variations of pressure in that portion of the train brake pipe extending in both directions from the slave locomotive. This multiple unit locomotive control system embodies, on the slave locomotive, brake pipe charging cut-off apparatus including differential pressure operated means operable, in response to an increase of the rate of flow of fluid under pressure to the train brake pipe via the brake valve on the slave locomotive to compensate for the reduction of pressure in the train brake pipe effected by operation of the brake control apparatus on the lead locomotive and cars in the train, to cut-off or terminate this flow of fluid under pressure to the train brake pipe thereby enabling the engineer on the lead locomotive by manual operation of the brake control console provided on this locomotive to effect a brake application on the entire train notwithstanding loss of radio control of the slave locomotive.

The above-mentioned differential pressure operated cut-off means has been found unreliable for the purpose intended in that it is inoperative to effect, upon loss of radio control of the slave locomotive cut-off of flow of fluid under pressure to the train brake pipe in those instances where a small degree of train brake pipe leakage is present.

The above-mentioned differential pressure operated cut-off means embodies a double abutment self-lapping valve device operable, upon the establishment of a differential of pressure on the opposite sides of the larger of the abutments, to supply fluid under pressure to one side of the smaller of the abutments until a pressure thereon is attained which is proportional, or corresponds in degree, to that reduction in pressure effected on the corresponding side of the larger abutment to provide the above-mentioned differential of pressure, it being understood that this differential of pressure on the opposite sides of the larger abutment is obtained by connecting the respective corresponding and other sides of the larger abutment to respectively, the downstream and upstream sides of a choke or restriction disposed in the supply pipe extending from the main reservoir on the slave locomotive to the relay valve of the brake valve on this locomotive.

The one side of the smaller abutment of the self-lapping valve device is connected directly to one side of an abutment of a differential pressure operated switch device and is also connected to the other side of this abutment and to a volume reservoir via a choke. This pressure switch is operable upon the establishment of a chosen differential of pressure on the respective opposite sides of its abutment to open, through a logic network, a power supply circuit to a solenoid operated valve which, when thus deenergized, effects the supply of fluid under pressure from the main reservoir on the respective slave locomotive to the brake pipe cut-off valve of the brake valve on the slave locomotive to thereby effect closure of this cut-off valve thus terminating charging of the train brake pipe.

The size of the above-mentioned choke used in the brake control apparatus presently used on slave locomotives is such that, when the train brake pipe leakage is a minimum or quite small, the differential of pressure established on the opposite sides of the abutment of the differential pressure switch, in response to the increase of rate of flow of fluid under pressure to the train brake pipe via the cut-off valve on a slave locomotive as the result of the release of fluid under pressure from the train brake pipe effected by manual operation of the brake control console on the lead locomotive and the quick service activity of the control valves on the cars in the train resulting therefrom, is insufficient to cause opening of this pressure switch. Consequently, closure of the brake pipe cut-off valve on the slave locomotive and termination of brake charging at this time does not occur.

Accordingly, it is the general purpose of this invention to provide means operable to cause closure of the cut-off valve of the brake valve on a salve locomotive regardless of the degree of train brake pipe leakage present at the time of effecting a service brake application subsequent to loss of radio control of the brake equipment on the slave locomotive.

SUMMARY OF THE INVENTION

According to the present invention, the differential of pressure for operating a pressure switch to effect closure of the brake pipe cut-off valve of the brake valve on a slave locomotive is established by a single choke so long as train brake pipe leakage is less than a chosen value, and is established by this choke and a second choke connected in parallel relation therewith upon train brake pipe leakage exceeding said chosen value, the sum of the areas of these two chokes being equal to the area of the choke presently used in the brake control apparatus now provided on slave locomotives. The second choke is connected in parallel with the first by operation of a fluid pressure operated valve device operable to an open position in response to the pressure on the downstream side of the first choke exceeding a chosen value, this pressure being obtained only while train brake pipe leakage exceeds a chosen amount.

In other words, connecting the second choke in parallel with the first choke reduces the sensitivity of operation of the pressure switch so that it is not operative in response to small changes in the rate of flow of fluid under pressure to the train brake pipe that are less than a chosen change of rate of flow which chosen change of rate of flow is greater than that heretofore required to operate this switch device. Accordingly, it will be understood that flow of fluid directly to one side of the abutment of the pressure switch and simultaneous flow through two chokes connected in parallel to the other side of this abutment produces a smaller differential of pressure on opposite sides of the abutment for operating this switch than is obtained were only one choke is used.

Figure 1:
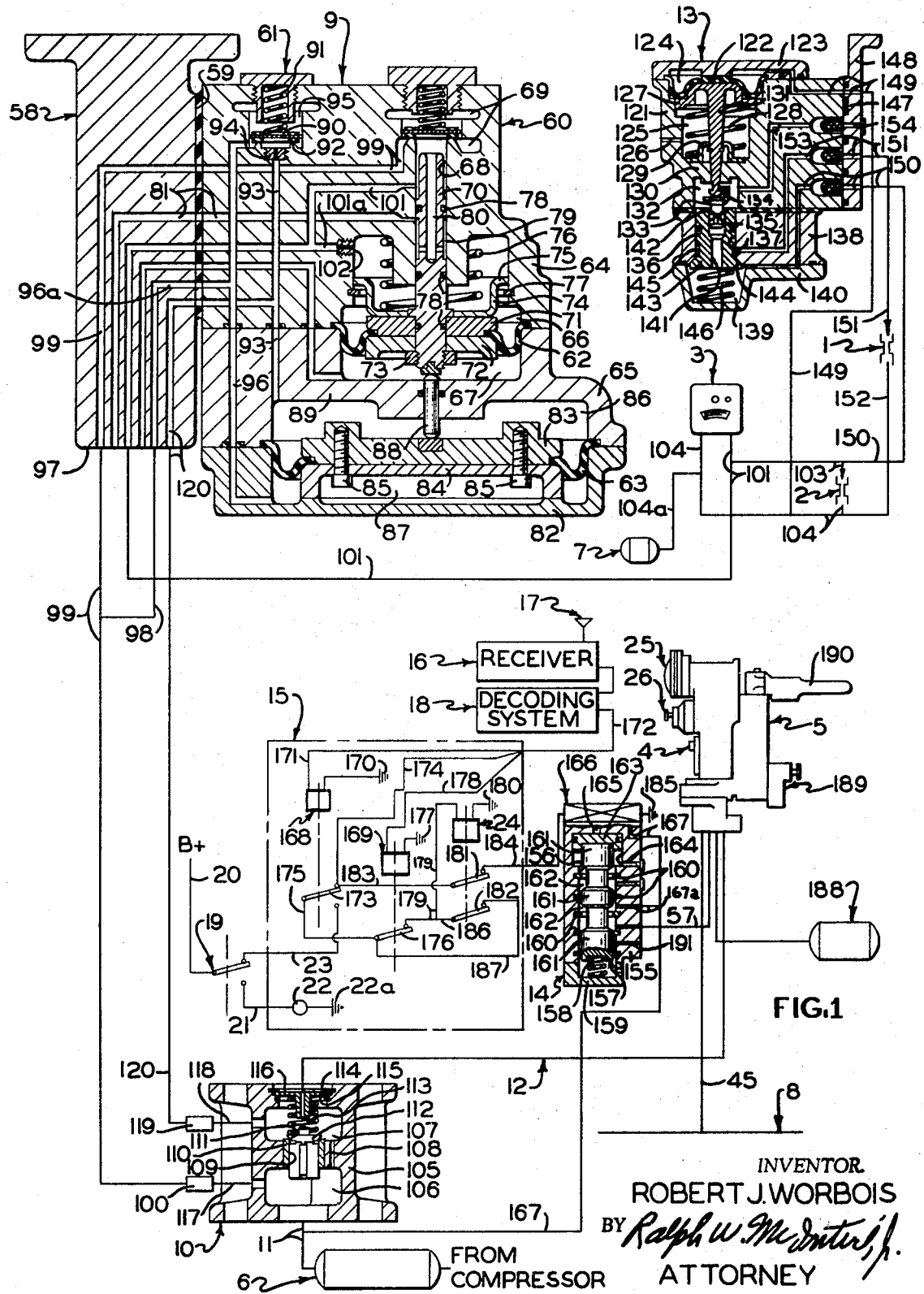
FIG. 1 is a diagrammatic view of a brake control equipment embodying the invention employed on a locomotive when it is used as a slave locomotive in RMU operation.

As shown in FIG. 1 of the drawings, the conventional control equipment theretofore provided on a locomotive when it is used as a slave locomotive in remote multiple unit operation is modified by the inclusion in the differential pressure operated means for effecting closure of the brake pipe cut-off valve of the brake valve on this locomotive of a second choke 1 in addition to a single choke 2 heretofore used for obtaining the differential of pressure required to effect operation of a differential pressure switch device 3 to cause closure of a brake pipe cut-off valve 4 of an automatic brake valve 5 that constitutes a part of the brake control equipment for controlling operation of the brakes on the slave locomotive.

This modified brake control equipment, which includes the present invention, further comprises a plurality of reservoirs including a main reservoir 6 and a volume reservoir 7, a brake pipe 8 that extends from end to end of the locomotive and at each end is coupled to the train brake pipe by the usual hose and hose couplings, a fluid pressure operated control valve device 9 for controlling the supply of fluid under pressure to the switch device 3 in accordance with the rate of flow of fluid under pressure through a flow indicator adapter 10 connected to the main reservoir 6 by a supply pipe 11 and to the brake valve 5 by a delivery pipe 12, a fluid pressure operated valve device 13 operable to connect the choke 1 in parallel relation to the choke 2, a solenoid-operated spool-type valve device 14 operable to effect the supply of fluid under pressure from the main reservoir 6 to the brake pipe cut-off valve 4 to cause closure of this valve device thereby terminating charging of the train brake pipe via the brake valve 5, and a function selector unit 15 having a plurality of electrical relays certain of which control, in cooperation with the switch device 3, the power supply circuit of the solenoid-operated spool-type valve device 14 in a manner hereinafter described.

In order to effect operation of the brake equipment on the slave locomotive via radio signals transmitted thereto from the lead locomotive, the slave locomotive brake control equipment embodying the present invention further includes, in addition to the above-mentioned function selector unit 15, a radio receiver 16 for receiving via an antenna 17 information in the form of radio command signals transmitted from the lead locomotive, and converting these radio signals to electrical inputs which are fed to a decoding system 18 that in turn transmits the information regarding the command signals to the function selector unit 15 to control operation of certain of its relays which control in cooperation with the switch device 3 the power supply circuit of the solenoid-operated spool-type valve device 14.

The brake pipe flow indicator switch device 3 may be of the type shown and described in U.S. Pat. No. 2,491,344, issued Dec. 13, 1949 to Erwin C. Vorman and comprises an abutment (not shown) for effecting the shifting of a contact 19 from a lower position, in which it completes a power supply circuit from a wire 20 connected to the positive terminal of any suitable source (not shown) of electrical power on the remote locomotive to a wire 21 connected to one terminal of an indicator light 22 the other terminal of which is connected to ground 22a, to an upper position in which the power supply circuit to the indicator light 22 is interrupted and a circuit is established between the wire 20 and a wire 23 to effect the supply of electrical power to the pick-up coil of a fluid pressure brake indicator relay 24 in a manner hereinafter described in detail.

The automatic brake valve 5 may be a No. 26-C type of self-lapping brake valve manufactured by the Westinghouse Air Brake Division of Westinghouse Air Brake Company, a subsidiary of American Standard, Inc.

The brake valve 5 comprises a relay valve 25, a self-lapping regulating or control valve 26, and the hereinbefore-mentioned brake pipe cut-off valve 4.

Figure 2:
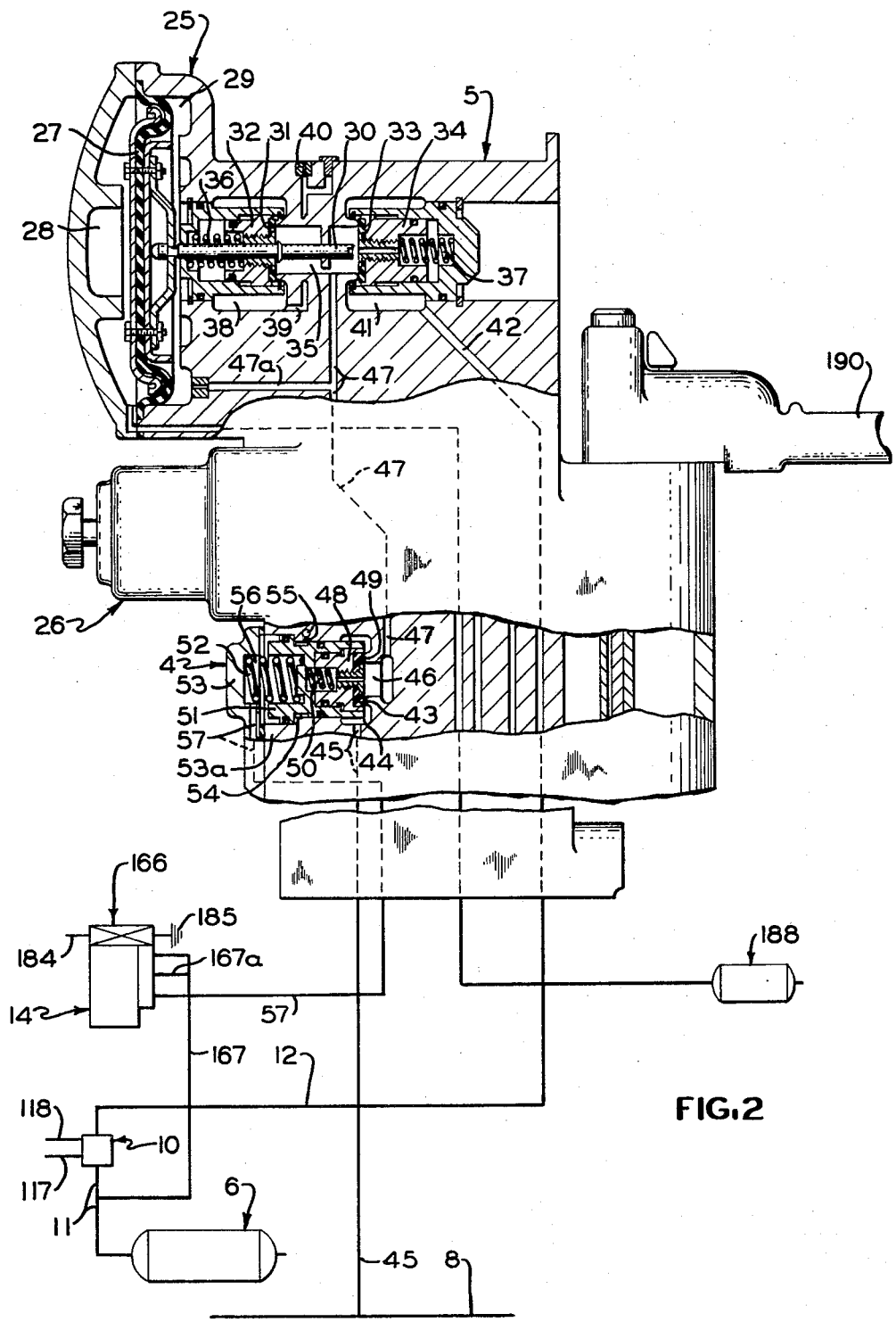
FIG. 2 is an enlarged view, partly in section, of the engineer's brake valve shown in FIG. 1.

Relay valve 25 comprises a diaphragm 27 (FIG. 2), which is subject opposingly to fluid pressures in a chamber 28 and a chamber 29 and is adapted through the medium of a coaxially arranged operating stem 30 to effect unseating of a disc-shaped exhaust valve 31 carried by an annular valve member 32 or effect unseating of a disc-shaped supply valve 33 carried by a coaxially arranged annular valve member 34, according to whether pressure in chamber 28 is less than or exceeds the pressure in chamber 29. Stem 30 is coaxially connected to the chamber 29 side of diaphragm 27 and projects centrally through valve member 32 and through a chamber 35 and is adapted to abut one end of supply valve member 34. Helical springs 36, 37 urge the valve members 32, 34 toward each other for normally concurrently seating the valves 31, 33. Exhaust valve 31 control communication between chamber 35 and a chamber 38 which is open to atmosphere via a passageway 39 and an exhaust choke 40; whereas supply valve 33 controls communication of chamber 35 with a supply chamber 41 that is always open to main reservoir 6 via a passageway 42 to one end of which is connected one end of the hereinbefore-mentioned delivery pipe 12, the pipe 12, flow indicator adapter 10 hereinafter described in detail and the supply pipe 11.

The brake pipe cut-off valve 4 comprises an annular cut-off valve 43 that is disposed in a chamber 44 which is constantly in communication with the brake pipe 8 via a passageway and correspondingly numbered pipe 45. This cut-off valve 43 controls communication between a chamber 46 that is connected respectively to the chamber 35 by a passageway 47 and to the chamber 29 by a branch passageway 47a and the chamber 44, and is carried by an annular member 48 normally biased against an annular valve seat 49 by a spring 50 interposed between the annular member 48 and one side of a piston member 51. A second spring 52 is interposed between the opposite side of the piston member 51 and a cover member 53 secured to a main casing 53a of the brake valve 5 by any suitable means (not shown). An annular chamber 54 at the right-hand side of the piston member 51 is constantly open to atmosphere via an exhaust passageway and port 55, and a chamber 56 at the left-hand side of this piston member 51 is normally vented to atmosphere via a passageway and correspondingly numbered pipe 57 and the solenoid operated valve device 14 in a manner hereinafter made apparent.

The control valve device 9 shown in FIG. 1 of the drawings comprises a pipe bracket 58 having a face 59 on which is mounted a self-lapping valve device 60 that has a check valve device 61, the purpose of which is hereinafter made apparent.

Briefly, the self-lapping valve device 60 preferably comprises two coaxially arranged movable abutments or diaphragms 62 and 63 of different effective areas cooperatively, though not positively, connected so as to constitute a stack, as will be understood from subsequent description. The outer periphery of the smaller diaphragm 62 is clamped between two casing sections 64 and 65 comprising a sectionalized casing of the self-lapping valve device 60. These casing sections are secured together by any suitable means (not shown).

The diaphragm 62 cooperates with the casing sections 64 and 65 to form within the self-lapping valve device 60 and on opposite sides of the diaphragm a first pair of chambers 66 and 67, the latter being opened to atmosphere.

The casing section 64 of the self-lapping valve device 60 is provided with a bore 68 which opens at one end into a chamber 69 adjacent the upper end of the casing section 64 and which opens at the other end into the chamber 66. Slidably mounted in the bore 68 is a valve stem 70, the lower end of which extends through two diaphragm followers 71 and 72, disposed on opposite sides of the diaphragm 62, and is screw threaded to receive a nut 73 which has screw-threaded engagement with this end of the valve stem 70 to operatively connect the center of the diaphragm 62 to the diaphragm followers 71 and 72 and to the valve stem 70. Resting against the upper side of the diaphragm follower 71 is a cup-shaped spring seat 74 having a peripheral annular flange 75. Disposed within the chamber 66 between the casing section 64 and the spring seat 74 is a spring 76 for biasing the valve stem 70 and the diaphragm 62 in a downward direction. The spring 76 and spring seat 74 are retained in the chamber 66 by means of a snap ring 77 that is inserted in a groove formed in the wall of casing section 64.

The valve stem 70 is provided with three axially spaced-apart peripheral annular grooves in each of which is disposed an O-ring seal 78 to prevent leakage of fluid under pressure between the periphery of the valve stem and the wall of the bore 68, and between the chambers 66 and 67. The valve stem 70 has formed thereon intermediate its ends a peripheral annular groove 79 which, as shown in the drawing illustrating the relative positions of the parts of the self-lapping valve device 60 in the release position, is so located that the upper end of the bore 68 is open to atmosphere via a passageway 80 extending from the upper end of the valve stem 70 longitudinally therethrough to the location thereon at which the peripheral annular groove 79 is formed, and thence crosswise the valve stem 70 so as to open at the surface of the groove 79, and then via a passageway 81 extending through the casing section 64 and the pipe bracket 58.

The outer periphery of the larger diaphragm 63 is clamped between the casing section 65 and a cover 82 which is secured to the casing section 65 by any suitable means (not shown). The center of the larger diaphragm 63 is clamped between two diaphragm followers 83 and 84 which are secured together by a plurality of cap screws 85 that pass through corresponding smooth bores in the diaphragm follower 84 and have screw-threaded engagement with coaxial threaded bottom bores in the diaphragm follower 83.

The larger diaphragm 63 cooperates with the casing section 65 and cover 82 to form within the self-lapping valve device 60 and on opposite sides of the diaphragm 63, a second pair of chambers 86 and 87. A cylindrical pusher stem 88 arranged coaxially with the movable abutments or diaphragms 62 and 63 has sealing, slidably guided contact with the wall of an aligned bore through a casing partition 89 separating the chamber 86 from the atmospheric chamber 67, the ends of the pusher stem 88 abuttingly contacting, respectively, the lower end of the valve stem 70 and the upper side of the diaphragm follower 83.

The hereinbefore-mentioned check valve device 61 comprises a flat disc-type valve 90 that is normally urged by a light bias spring 91 into seating contact with an annular valve seat 92 formed adjacent one end of a passageway 93 in the casing section 64, the opposite end of which passageway 93 opens into the chamber 86 above the larger diaphragm 63. Disposed in the passageway 93 is a choke 94 to control the rate of one-way flow of fluid under pressure from the chamber 86, upon unseating of the flat disc type check valve 90 from the annular valve seat 92, to an outlet chamber 95. The outlet chamber 95 is in constant communication with the chamber 87 below the larger diaphragm 63 by way of a passageway 96 extending from the chamber 95 through the casing sections 64 and 65 and the cover 82. A branch passageway 96a extends through the casing section 64 and the pipe bracket 58 and opens at a flat face 97 formed on the lower side of the pipe bracket 58. The end of the branch passageway 96a opening at the flat face 97 on the pipe bracket 58 is provided with a tapped port into which is received one threaded end of a pipe 98. The opposite end of the pipe 98 is connected to a pipe 99 intermediate the ends thereof. One end of this pipe 99 is connected to a correspondingly numbered passageway that extends through the pipe bracket 58 and casing section 64 and opens into the hereinbefore-mentioned chamber 69 in the valve device 60 and the opposite end is connected to the delivery end of a first strainer device 100 which may be of any suitable construction.

Opening at the wall surface of the bore 68 is one end of a passageway 101 that extends through the casing section 64 and pipe bracket 58 and is connected by a correspondingly numbered pipe to a chamber (not shown) at the upper side of the hereinbefore-mentioned abutment of the switch device 3. A branch passageway 101a having therein a choke 102 connects the passageway 101 to the chamber 66 above the diaphragm 62.

Connected to the pipe 101 intermediate the ends thereof is one end of a pipe 103 that has its opposite end connected to the inlet or upper side of the herebefore-mentioned choke 2. The outlet or lower side of this choke 2 is connected by a pipe 104 a chamber (not shown) at the lower side of the abutment of the switch device 3. A branch pipe 104a connects the pipe 104 to the volume reservoir 7.

The flow indicator adapter 10 comprises a casing 105 having therein two chambers 106 and 107 into which open respectively one end of the hereinbefore-mentioned supply pipe 11 and delivery pipe 12. These chambers 106 and 107 are connected by two parallel bores 108 and 109 the first of which is of small diameter so as to constitute a choke. A bushing 110 having an annular valve seat 111 at its upper end is press-fitted into the bore 109. A check valve 112 is normally biased against the valve seat 111 by a spring 113 that is interposed between this check valve and a spring seat 114 which is retained against a shoulder 115 formed on the casing 105 by a snap ring 116 inserted in a groove provided therefor in the casing.

Opening into the chamber 106 in adapter 10 is one end of a pipe 117 that has its opposite end connected to the inlet end of the hereinbefore-mentioned strainer device 100.

Likewise, opening into the chamber 107 in adapter 10 is one end of a pipe 118 the opposite end of which is connected to the inlet end of a second strainer device 119 which may be identical to the first strainer device 100. Connected to the delivery end of this strainer device 119 is one end of a pipe 120 the opposite end of which is connected to a correspondingly numbered passageway extending through the pipe bracket 58 and the casing section 64 of control valve device 9 and opening into the hereinbefore-mentioned passageway 93 intermediate the ends thereof.

The fluid pressure operated valve device 13, comprises a casing section 121 containing a diaphragm 122 clamped about its periphery between the casing section 121, and a cover 123, and defining with the cover a control chamber 124. At the other side of the diaphragm 122 is a spring chamber 125 which is open to atmosphere through a passageway 126. Contained in the chamber 125 is a diaphragm follower 127 which is biased into operative contact with the diaphragm 122 by a spring 128 interposed between the follower 127 and a hollow spring seat 129 that rests against a partition wall 130 of the chamber 125. Follower 127 has a stem 131 that extends through the hollow spring seat 129 and a central opening in the partition wall 130.

A chamber 132 is formed in the casing section 121 at the side of the partition wall 130 opposite the chamber 125 and contains a valve 133 that is linked by means of a forked connection 134 to the lower end of follower stem 131, as viewed in FIG. 1 of the drawings. The valve 133 is adapted to make seating contact with a valve seat 135 formed on the upper end of a cylindrical valve member 136 which is slidably mounted in a bore 137 formed in a casing section 138 which is secured to the casing section 121 by any suitable means (not shown). The bore 137 in the casing section 138 extends from the chamber 132 to a chamber 139 formed in another casing section 140 secured to the casing section 138 by any suitable means (not shown).

The valve member 136 is provided with a through bore 141 and a coaxial counterbore 142 encircled at its upper end by the valve seat 135. The lower end of the cylindrical valve member 136 is encircled by a conical or poppet-type valve 143, which valve is arranged for cooperation with a valve seat 144 formed on the casing section 138 at the lower end of bore 137 to control communication between chamber 139 and a chamber 145 defined by the wall of the bore 137 and a reduced portion of the valve member 136. A spring 146 is disposed in chamber 139 and is interposed between the valve 143 and the casing section 140 for urging the valve member 136 upwardly to a position in which communication between chambers 132 and 139 is open via bore 141 and counterbore 142, and communication between chamber 139 and chamber 145 is closed, as shown in FIG. 1 of the drawings.

In order that fluid under pressure may be supplied to the chamber 124 in the fluid pressure operated valve device 13 for effecting operation of this valve device, the chamber 124 is connected by a passageway and correspondingly numbered pipe 149 to the hereinbefore-mentioned pipe 104 intermediate the ends thereof.

Likewise, in order that the operation of the valve device 13 effect connecting the hereinbefore-mentioned choke 1 in parallel relation to the choke 2, the diameter of which is the same as that of the choke 1, the chamber 139 is connected to the hereinbefore-mentioned pipe 103 intermediate the ends thereof by a passageway 150 extending through the casing sections 140, 138 and 121 of the valve device 13 and the pipe bracket 148 and a correspondingly numbered pipe, and the chamber 145 is connected to the inlet end of the choke 1 by a passageway 151 extending through the casing sections 138 and 121 and the pipe bracket 148 and a correspondingly numbered pipe. The outlet end of the choke 1 is connected to the pipe 104 intermediate the ends thereof by a pipe 152. A passageway 153 provided in the casing section 121 has one end opening into the chamber 132 and the opposite end opening at the bolting face 147 where it is closed by a plug 154 carried in the pipe bracket 148.

The solenoid-operated valve device 14 comprises a casing 155 provided with a bore 156 in which is sealingly and slidably mounted a spool-type valve 157 that is normally biased to the position shown in FIG. 1 by a spring 158 interposed between the lower end of the valve 157 and a cover 159 secured to the lower end of the casing 155 by any suitable means (not shown).

The wall surface of the bore 156 is provided with five spaced-apart annular grooves in each of which is disposed a sealing member 160, the inner edge of which is adapted to form a seal with one or another of a plurality of land portions 161 formed on the spool-type valve 157. A peripheral annular groove 162 is formed on the valve 157 between each adjacent pair of land portions 161.

As shown in FIG. 1 of the drawings, an operating piston 163 is disposed in a counterbore 164 that is coaxail with the bore 156. This piston 163 is interposed between the upper end of the spool valve 157 and the end of the counterbore 164 into which opens one end of a passageway 165.

Secured to the upper end of the casing 155 is a solenoid operated valve 166 of any suitable construction which is operable, when its operating coil is energized, to establish a fluid pressure communication between a passageway 167 and a correspondingly numbered pipe that is connected to the main reservoir pipe 11 and the passageway 165.

The hereinbefore-mentioned function selector unit 15 comprises, in addition to the fluid pressure brake indicator relay 24, a loss of continuity relay 168 and a brake release relay 169.

The loss of continuity relay 168 is provided with a pick-up coil one end of the winding of which is connected to ground as indicated by the numeral 170. The other end of the winding of this coil is connected to a wire 171 that constitutes one of the wires in a cable 172 that connects the function selector unit 15 to the decoding system 18. This loss of continuity relay 168 is further provided with a normally picked up contact 173 which, in its picked up position, establishes a circuit between a wire 174 that constitutes a second one of the wires in the cable 172 and has one end connected to one terminal of the contact 173 and a wire 175 that has one end connected to the other terminal of the contact 173 and the other end connected to one terminal of a single contact 176 of the brake release relay 169.

The brake release relay 169 has a pick-up coil one end of the winding of which is connected to ground as indicated by the numeral 177. The other end of the winding of this coil is connected to a wire 178 that constitutes a third one of the wires in the cable 172.

Connected to the other terminal of the contact 176 of brake release relay 169 is one end of a wire 179 that has its opposite end connected to one end of the winding of the pick-up coil of the fluid pressure brake indicator relay 24. The other end of the winding of this soil is connected to ground as indicated by the numeral 180.

The fluid pressure brake indicator relay 24 is provided with an upper contact 181 and a lower contact 182. One terminal of the upper contact 181 is connected by a wire 183 to the above-mentioned one terminal of the contact 173 to which terminal the one end of the wire 174 is also connected, as aforestated. Connected to the other terminal of this upper contact 181 is one end of a wire 184 that has its other end connected to one end of the winding of the solenoid-operated valve 166 the other end of this winding being connected to ground as indicated by the numeral 185.

Connected to one terminal of the lower contact 182 of relay 24 is one end of a wire 186 that has its other end connected to the wire 179 intermediate the ends thereof. Connected to the other terminal of the lower contact 182 is one end of a wire 187 that has its other end connected to the above-mentioned one terminal of the contact 176 to which terminal the above-mentioned other end of the wire 175 is also connected, as explained above.

OPERATION

Let it be supposed that in addition to a lead locomotive in an RMU train consist, a slave locomotive is coupled between two cars at some suitable location in the train which may be a distance from the lead locomotive, and that this slave locomotive is provided with the radio controlled brake apparatus shown in the drawings with the addition of a brake control center which may be, such as, for example, an A-410 brake control center manufactured by the Westinghouse Air Brake Division of Westinghouse Air Brake Company, a subsidiary of American Standard, Inc. It will be understood that this A-410 brake control center includes the solenoid-operated valve device 14 and a plurality of other valve devices which are not shown in the drawings since they are not necessary for an understanding of the present invention.

It will be further understood that this brake control apparatus shown in the drawings and provided on the slave locomotive is operated in response to radio transmitted signals from the lead locomotive to control the pressure in an equalizing reservoir 188 on this slave locomotive and correspondingly the pressure in that portion of the train brake pipe extending in both directions from this slave locomotive.

After a train is made up, the lead locomotive and the slave locomotive having radio operated remote control equipment must be conditioned as follows:

1. The controls on the lead locomotive set for lead operation.
2. A selector valve 189 of the brake valve 5 on both the lead locomotive and the slave locomotive having remote control equipment set in freight position.
3. The power supply switch of a selector and indicator console (not shown) on the lead locomotive is set in Power ON position it being understood that a fluid pressure brake switch on this console is set in an IN position, subsequent to the setting of this power supply switch in its Power ON position.
4. The controls on the slave locomotive having remote control apparatus as shown in the drawings set for trailing operations, except for the fluid pressure brakes, which must be set for lead operation.
5. A handle 190 of the brake valve 5 on the lead and slave locomotives in the train must be moved to its brake release position.
6. The function selector unit 15 which is provided on the slave locomotive is set in Power ON position.

In order to initially effect charging of that portion of the train brake pipe extending from end to end of the lead locomotive and through each car and the slave locomotive in the train and the brake equipment on all the locomotives and cars, the engineer on the lead locomotive will manually depress the brake release button of the brake control console on this locomotive. The brake control center on the lead locomotive will then operate to cause the relay valve of the brake valve on the lead locomotive to effect the supply of fluid under pressure from the main reservoir on the lead locomotive to that portion of the train brake pipe connected to this locomotive.

Depressing the release button of the brake control console on the lead locomotive is effective to cause radio control equipment provided on the lead locomotive to effect the transmission of a brake release command signal to the slave locomotive which is provided with the radio controlled apparatus shown in the drawings.

This brake release command signal is received by the antenna 17 of the radio receiver 16 on the slave locomotive and it effects, via the corresponding decoding system 18, wire 178 in cable 172, the winding of the pick-up coil of the brake release relay 169 and ground 177, energization of this winding whereupon the contact 176 of this relay 169 is picked up. In the picked up position of the contact 176 it establishes a circuit between wires 175 and 179.

Furthermore, the brake release command signal received on the slave locomotive effects, via the corresponding decoding system 18, wire 171 in cable 172, the winding of the pick-up coil of the loss of continuity relay 168 and ground 170, energization of this winding whereupon the contact 173 of this relay 168 is picked up. In the picked up position of the contact 173 it establishes a circuit between the wires 174 and 175.

It may be seen from FIG. 1 of the drawings that, with the contacts 173 and 176 in their picked up position, the decoding system 18 is effective to supply power from a source of power therein (not shown) to the pick-up coil of relay 24 via the wire 174, contact 173, wire 175, contact 176, wire 179, the winding of this pick-up coil and ground 180. Consequently, relay 24 operates to its picked up position in which its contacts 181 and 182 are closed, as shown in FIG. 1.

In the picked up position of contact 182 a "stick" circuit is established for the relay 24. This circuit extends from the wire 174 to the winding of the pick-up coil of relay 24 via contact 173 of relay 168, wires 175 and 187, contact 182 now in its picked up position shown, wire 186, and wire 179, it being noted from FIG. 1 of the drawings that this winding is connected to ground at 180. Consequently, the engineer may remove his finger from the release button of the brake control console on the lead locomotive whereupon the brake release relay 169 will be deenergized and its contact 176 will return to its dropped out position.

While the contact 181 of relay 24 is in its picked up position a power supply circuit is established for the solenoid operated valve 166. This circuit extends from the source of power in the decoding system 18 to one end of the winding of the solenoid operated valve 166 via wires 174 and 183, contact 181 and wire 184, thence through this winding and to ground 185.

When the power supply circuit for the solenoid operated valve 166 is thus established, this valve operates to connect the passageway 165 to the passageway and pipe 167 whereupon fluid under pressure will flow from the main reservoir 6 to the upper side of the piston 163 via pipe 11, pipe and passageway 167, the solenoid operated valve 166 and the passageway 165. Fluid under pressure thus supplied to the upper side of the piston 163 is effective to move this piston and the spool-type valve 157 downward from the position shown against the yielding resistance of spring 158 to a second position in which the lower groove 162 on the valve 157 establishes a communication between a passageway to which one end of the hereinbefore-mentioned pipe 57 is connected and an exhaust passageway 191. Thus, the chamber 56 (FIG. 2) in the brake pipe cut-off valve 4 is open to atmosphere via passageway and pipe 57, lower groove 162 and passageway 191.

Since the handle 190 of the brake valve 5 on the slave locomotive now occupies its release position, as aforestated, the corresponding relay valve 25 will operate to effect the supply of fluid under pressure from the supply chamber 41 (FIG. 2) which is connected to the main reservoir 6 via passageway 42, pipe 12, flow indicator adapter 10 and pipe 11, to the chamber 35 from whence it will flow to the chamber 46 via the passageway 47 and unseat the cut-off valve 43 from its seat 49.

With cut-off valve 43 unseated, the fluid under pressure supplied to the chamber 46 from the main reservoir 6 will flow past the valve 43 and thence to the brake pipe 8 via passageway and pipe 45. Thus, fluid under pressure is supplied from the main reservoir 6 on the slave locomotive to the train brake pipe simultaneously as fluid under pressure is supplied from the main reservoir on the lead locomotive to the train brake pipe via the brake valve on the lead locomotive until the train brake pipe is fully charged to the pressure normally carried therein.

The brake control valves on all the locomotives and cars in the train will operate in response to the charging of the train brake pipe to effect a release of the brakes on the respective locomotives and cars.

It will be understood that as the pressure in that portion of the train brake pipe 8 that extends through the slave locomotive and from each end thereof is reduced as the result of leakage of fluid under pressure from the train brake pipe, the relay valve 25 of the brake valve 5 on the slave locomotive will operate in the usual manner in response to this reduction of brake pipe pressure to effect the supply of fluid under pressure from the corresponding main reservoir 6 to the brake pipe 8 via supply pipe 11, chamber 106 in flow indicator adapter 10, past check valve 112 and through choke 108 in parallel therewith, chamber 107, delivery pipe 12, passageway 42 (FIG. 2), chamber 41, past now unseated supply valve 33, chamber 35, passageway 47, chamber 46, past cut-off valve 43 which is unseated from valve seat 49 in response to the fluid under pressure supplied to the chamber 46, chamber 44 and passageway and pipe 45.

It is apparent that, as fluid under pressure flows from the main reservoir 6 on the slave locomotive to the train brake pipe in the manner just described, a difference of pressure in the chambers 106 (FIG. 1) and 107 in the flow indicator adapter 10 is produced which increases in magnitude accordingly as the rate of flow of fluid under pressure from the main reservoir 6 to the train brake pipe increases it being understood that the greater the train brake pipe leakage the greater the rate of flow.

Since the chamber 106 is connected to the chamber 87 in the control valve device 9 via pipe 117, strainer device 100, pipes 99 and 98, branch passageway 96a and passageway 96, and the chamber 107 is connected to the chamber 86 in this valve device 9 via pipe 118, strainer device 119, pipe and passageway 120, and passageway 93, a corresponding difference of pressure is produced in the chambers 87 and 86 which establishes a differential of pressure on the opposite sides of the diaphragm 63.

This differential of pressure acting on the diaphragm 63 is effective to deflect this diaphragm upward and cause the self-lapping valve device 60 to operate in the usual manner of self-lapping valve devices to establish a pressure in the chamber 66 and in the passageway and pipe 101 that is proportional to this differential of pressure, it being understood that this differential of pressure and likewise the pressure established in the pipe 101 increases as the rate of flow of fluid under pressure from the main reservoir 6 on the slave locomotive to the train brake pipe increases.

It may be seen from FIG. 1 of the drawings that the pipe 101 is connected to the right-hand side of the differential pressure switch device 3 and that fluid under pressure supplied to this pipe 101 may flow to the pipe 104, which is connected to the left-hand side of switch device 3 and to the volume reservoir 7 via branch pipe 104a, via pipe 103 and choke 2.

Furthermore, it may be seen from FIG. 1 that fluid under pressure supplied to the pipe 103 may flow to the chamber 139 in the valve device 13 via pipe and passageway 150, and that fluid under pressure supplied to the pipe 104 may flow to the chamber 124 in the valve device 13 via pipe and passageway 149, it being understood that the strength of the spring 128 is such that the diaphragm 122 is not deflected downward to effect unseating of valve 143 from its seat 144 until a pressure of, for example, ten (10) pounds per square inch, is obtained in the chamber 124.

It will be understood that the differential of pressure obtained on the opposite sides of the diaphragm 63 of the control valve device 9 increases as the rate of flow of fluid under pressure from the main reservoir 6 to the train brake pipe via the flow indicator adapter 10 increases. Accordingly, the greater this rate of flow, the higher will be the pressure established in the pipe 101 by the valve device 9. Furthermore, it is apparent that the faster the pressure is established in the pipe 101, the greater will be the differential of pressure established on the opposite sides of the abutment of the switch device 3, it being understood that this differential of pressure is quickly dissipated since the pressure in the pipe 101 will promptly equalize into the pipe 104 and volume reservoir 7 via either the single choke 2 or both the chokes 1 and 2 when the choke 1 is connected in parallel relation to the choke 2 in a manner hereinafter explained. Therefore, the greater the rate of increase of flow of fluid under pressure from the main reservoir 6 to the train brake pipe, the greater will be the differential of pressure established on the opposite sides of the abutment of the switch device 3.

Moreover, it should be understood that the differential of pressure required to operate the switch device 3 to cause shifting of its contact 19 from the position shown in FIG. 1 is obtained only in response to a quick service wave of pressure reduction running through the train brake pipe from the lead locomotive to the slave locomotive provided with this switch device 3 and never in response to maximum allowable train brake pipe leakage since this maximum allowable leakage does not provide a differential of sufficient value.

If at any time loss of radio communication between the lead locomotive and the slave locomotive occurs, the loss of continuity relay 168 is deenergized whereupon its contact 173 drops from its upper position shown, in which it establishes a circuit between the wires 174 and 175, to its lower position in which it establishes a circuit between the wires 23 and 175. Upon movement of the contact 173 of relay 168 to its lower position, power is supplied from the positive (B+) terminal of the source of electrical power on the radio controlled slave locomotive to one end of the winding of the relay 24 via wire 20, contact 19 of switch device 3, wire 23, contact 173 now in its dropped out or lower position, wires 175 and 187, contact 182, wire 186 and wire 179 and thence through this winding to ground 180. Consequently, relay 24 will remain energized so long as contact 19 remains in the position shown.

While the relay 24 remains energized, its contacts 181 and 182 remain in the position shown so that the power supply circuit to the solenoid operated valve 166 is not interrupted. Therefore, the spool valve 157 remains in its lower position so that the chamber 56 (FIG. 2) in the brake pipe cut-off 4 of the brake valve 5 on the slave locomotive remains vented to atmosphere via the pathway hereinbefore described.

Let it be supposed that radio communication between the lead locomotive and the slave locomotive has been lost and let it be further supposed that the engineer on the lead locomotive subsequently depresses the brake application button of the brake control console on this locomotive. Upon the engineer depressing this brake application button, the brake equipment on the lead locomotive will respond thereto to effect a reduction of pressure in the train brake pipe. However, no brake application command will be received by the slave locomotive because of the loss of radio communication and the brake equipment thereon will remain in brake release position.

As the pressure in the train brake pipe on those cars adjacent the lead locomotive begins to reduce, the quick service valve of the brake control valves on these cars operate in response to this reduction of pressure to effect a further reduction of pressure in the train brake pipe. Therefore, a quick service reduction of train brake pipe pressure occurs serially from car to car from the lead locomotive to the slave locomotive.

As the pressure in that portion of the train brake pipe 8 that extends from end to end of the slave locomotive is reduced as the result of the above-mentioned quick service reduction of pressure in the train brake pipe, and also as the result of the leakage of fluid under pressure from the train brake pipe, the relay valve 25 of the brake valve 5 on the slave locomotive will operate in the manner hereinbefore described to effect the supply of fluid under pressure from the corresponding main reservoir 6 to the train brake pipe via the flow indicator adapter 10. Thus, the relay valve 25 on the slave locomotive operates to supply fluid under pressure to the train brake pipe as the brake equipment on the lead locomotive releases fluid under pressure from the train brake pipe. Accordingly, it is seen that it is desirable to effect operation at this time of the brake pipe cut-off valve 4 on the slave locomotive provided with the radio remote controlled brake equipment shown in the FIG. 1 to cause cut off of flow of fluid under pressure to the train brake pipe.

Let it be assumed that the train brake pipe leakage at this time is less than the hereinbefore-mentioned chosen value.

Accordingly, the control valve device 9 will operate to establish a pressure in the pipe 101 in accordance with rate of flow of fluid under pressure from the main reservoir 6 through the corresponding flow indicator adapter 10 to the train brake pipe. Therefore, fluid under pressure supplied to the pipe 101 will flow therefrom to the pipe 104, branch pipe 104a and volume reservoir 7 at a rate determined by the size or diameter of the single choke 2 until equalization of pressure in pipes 101 and 104 occurs. This fluid under pressure, if supplied to the pipes 101 and 104 at a sufficiently rapid rate, will establish a differential of pressure on the opposite sides of the abutment in switch device 3, and when this differential of pressure reaches a certain value which corresponds to a rapid rate of change of flow of fluid under pressure from the main reservoir 6 to the train brake pipe corresponding to the quick service reduction effected in the train brake pipe pressure while train pipe leakage is less than a chosen value, this abutment will operate to shift contact 19 of the switch device 3 from its upper position shown in FIG. 1 in which it establishes a power supply circuit from the positive terminal (B+) of the source of power on the slave locomotive to the pick up coil of relay 24, to a lower position in which it establishes a power supply circuit to the indicator light 22 which is connected to ground as indicated by the numeral 22a.

Upon shifting of the contact 19 of the pressure switch device 3 to its lower position, the power supply circuit hereinbefore described for the pick-up coil of the relay 24 is interrupted whereupon the contacts 181 and 182 of this relay drop out to respectively open the power supply circuit to the pick-up coil of the solenoid operated valve 166 and the "stick" circuit to the pick-up coil of the relay 24.

Upon opening the power supply circuit to the pick-up coil of the solenoid operated valve 166, the supply of fluid under pressure from the pipe 167, which is connected to the main reservoir 6 via pipe 11, to the chamber at the upper side of the piston 163 is cut off and this chamber vented to atmosphere. When fluid under pressure is thus released from the chamber at the upper side of piston 163, the spring 158 is rendered effective to move this piston 163 and the spool valve 157 upward to the position shown in FIG. 1.

It can be seen from FIG. 1 that while the spool valve 157 occupies the position shown that the lower annular groove 162 thereon establishes a communication between a branch passageway and pipe 167a that is connected to the pipe 167 and the passageway and pipe 57.

Consequently, fluid under pressure will now flow from the main reservoir 6 to the chamber 56 (FIG. 2) in the brake pipe cut-off valve 4 via pipes 11 and 167 (FIG. 1), branch pipe and passageway 167a, lower groove 162 on spool valve 157 and passageway and pipe 57 to effect movement of piston member 51 (FIG. 2) and annular member 48 in the direction of the right hand until cut-off valve 43 is seated on valve seat 49 thereby preventing further flow of fluid under pressure from the main reservoir 6 on the slave locomotive to the train brake pipe.

Now let it be supposed that the train brake pipe leakage is greater than the hereinafter-mentioned chosen value. Therefore, a greater rate of flow of fluid under pressure from the main reservoir 6 on the slave locomotive to the train brake pipe will occur than when train brake pipe leakage is less than this chosen value. Accordingly, the control valve device 9 will operate in response to this greater rate of flow of fluid under pressure to the train brake pipe via adapter 10 to establish a correspondingly higher pressure in the pipes 101 and 103. Likewise, by flow thereto from the pipe 103 via the choke 2, a correspondingly higher pressure will be quickly established in the pipe 104, pipe and passageway 149 and chamber 124 in the fluid pressure operated valve device 13.

The above-mentioned higher pressure established in chamber 124 is sufficient to deflect diaphragm 122 downward against the yielding resistance of the spring 128 to effect unseating of valve 143 from its seat 144 to thereby connect the choke 1 in parallel relation to the choke 2. Consequently, fluid under pressure will now flow from the pipe 103 to the pipe 104 via the choke 2, and also via pipe and passageway 150, chamber 139 in valve device 13, past now unseated valve 143, chamber 145, passageway and pipe 151, choke 1 and pipe 152.

With fluid under pressure supplied from the pipe 103 to the pipe 104 via the two chokes 1 and 2 now connected in parallel, it will be seen that a faster rate of pressure increase must be established in the pipes 101 and 103 by the valve device 9 in order to provide that differential of pressure on the opposite sides of the diaphragm of the switch device 3 that is necessary to cause this switch device 3 to shift its contact 19 from the position shown in FIG. 1 to the position in which it opens the power supply circuit to the relay 24 to cause closure of the brake pipe cut-off valve 4 of the brake valve 5 on the slave locomotive.

In other words, the rate of change of flow to the train brake pipe must create a more rapid increase in the drop in pressure across the flow indicator adapter 10 in order to effect operation of the switch device 3 to shift its contact 19 to the position in which the circuit between wires 20 and 23 is open. This more rapid increase in the drop in pressure across the flow indicator adapter 10 is the result of greater train brake pipe leakage. Accordingly, the apparatus provided by the present invention renders the switch device 3 less sensitive while train brake pipe leakage is greater than the hereinbefore-mentioned chosen value than while train brake pipe leakage is less than this chosen value.

It will be understood that, with the chokes 1 and 2 connected in parallel, upon obtaining that difference in pressure on the opposite sides of the diaphragm of switch device 3 required to operate this device, the brake pipe cut-off valve 4 of the brake valve 5 on the slave locomotive will be closed in the manner hereinbefore described to prevent further flow of fluid under pressure to the train brake pipe from the main reservoir 6 on this slave locomotive thereby enabling the engineer on the lead locomotive to effect a brake application on the entire train.

When the necessary repairs have been made to restore radio communication between the lead and slave locomotives, the engineer on the lead locomotive may depress the brake release button of the brake control console on this locomotive whereupon the relays 168 and 169 on the slave locomotive will pick-up their respective contacts 173 and 176 to establish the power supply circuit to the relay 24 which in turn picks up its contacts 181 and 182 to establish respectively the power supply circuit to the solenoid operated valve 166 and the "-stick" circuit for the relay 24.

The solenoid operated valve 166 will now operate to supply fluid under pressure to the chamber above piston 163 whereupon this piston moves the spool valve 157 to its lower position to establish a communication between passageway and pipe 57 and passageway 191 through which fluid under pressure is released from chamber 56 (FIG. 2) in the brake pipe cut-off valve 4 to atmosphere. The relay valve 25 of the brake valve 5 on the radio controlled slave locomotive will now operate to supply fluid under pressure to the chamber 46 to unseat cut-off valve 43 and then flow past this valve to the train brake pipe which will now be quickly charged to the normal pressure carried therein by the flow of fluid under pressure thereto via the relay valve 25 of the brake valve 5 on both the lead and slave locomotives.

Having now described the invention, what I claim as new and desire to secure by Letters Patent, is:

1. In a multiple locomotive brake control system for a train of cars having a lead locomotive and a slave locomotive remotely located therefrom, brake control apparatus for the slave locomotive comprising the combination of:
   a. a normally charged brake pipe, variations of the fluid pressure in which are effective to control brake applications and brake release on the cars in the train,
   b. a normally charged equalizing reservoir,
   c. a normally charged main reservoir,
   d. a brake valve having:
      i. a relay valve which is subject to the opposing pressure in said equalizing reservoir and said brake pipe and is operative by the differential of the pressure in said equalizing reservoir and in said brake pipe to effect the supply of fluid under pressure from said main reservoir to said brake pipe to control the pressure therein,
      ii. valve means operative to effect the supply of fluid under pressure from said main reservoir to said equalizing reservoir to control the pressure therein, and
      iii. a fluid pressure operated brake pipe cut-off valve operative to cut off flow of fluid under pressure supplied from said main reservoir to said brake pipe by operation of said relay valve,
   e. coding and radio signal receiving means for receiving on the slave locomotive command signals transmitted thereto from the lead locomotive to control the brakes on the slave locomotive, wherein the improvement comprises:
   f. differential pressure operated means for controlling the supply of fluid under pressure to said fluid pressure operated brake pipe cut-off valve to cause said cut-off valve to cut off flow of fluid under pressure from said main reservoir to said brake pipe, said differential pressure operated means comprising:
      i. electro-responsive valve means operable to effect the supply of fluid under pressure from said main reservoir to said brake pipe cut-off valve,
      ii. a power supply circuit for said electro-responsive valve means,
      iii. electro-responsive relay means disposed in said power supply circuit and operable in response to radio command signals received from the lead locomotive by the coding and radio receiving means on the slave locomotive to complete said circuit and in response to loss of radio communication between said lead and slave locomotives to open said circuit,
      iv. means operable in response to a change in the rate of flow of fluid under pressure from said main reservoir to said brake pipe to establish a corresponding pressure differential,
      v. self-lapping valve means operable by said pressure differential to supply fluid under pressure corresponding in degree of pressure to said pressure differential,
      vi. a differential pressure operated switch device normally operative to maintain said power supply circuit upon operation of said electro-responsive relay means in response to said loss of radio communication and thereafter operable to open said circuit in response to a chosen differential of pressure established by said means in accordance with the change in the rate of flow of fluid under pressure from said main reservoir to said brake pipe,
      vii. a pair of chokes interposed between said self-lapping valve means and said switch device for controlling the establishment of said chosen differential of pressure by the fluid under pressure supplied by said self-lapping valve means, and
      viii. means operable in response to the fluid under pressure supplied for operating said switch device to connect one of said chokes in parallel relation with the other, said means operable only by a pressure exceeding a chosen value which is attained only upon the leakage of fluid under pressure from said train brake pipe occurring at a rate in excess of a chosen rate.

2. In a multiple locomotive brake control system for a train of cars, as recited in claim 1, further characterized in that said fluid pressure operable means is operated by the fluid pressure on the downstream side of said other choke.

3. In a multiple locomotive brake control system for a train of cars, as recited in claim 1, further characterized by a volume reservoir connected to the downstream side of said chokes.

4. In a multiple locomotive brake control system for a train of cars, as recited in claim 1, further characterized in that said fluid pressure operable means is provided with spring means whereby it is operable in response to a pressure exceeding a chosen pressure.

5. In a multiple locomotive brake control system for a train of cars, as recited in claim 1, further characterized in that the area of each of said pair of chokes is the same as that of the other.

6. In a multiple locomotive brake control system for a train of cars, as recited in claim 1, further characterized in that said other choke is effective alone to establish that differential of pressure required to operate said switch device in response to one rate of change in flow of fluid under pressure from said main reservoir to said brake pipe.

7. In a multiple locomotive brake control system for a train of cars, as recited in claim 6, further characterized in that said other choke is effective cojointly with said one choke while connected in parallel relation therewith to establish that differential of pressure required to operate said switch device in response to a second rate of change in flow of fluid under pressure from said main reservoir to said brake pipe, said second rate of change in flow being substantially greater than said first rate of change in flow.

* * * * *